US010323885B2

(12) United States Patent
De Jong et al.

(10) Patent No.: US 10,323,885 B2
(45) Date of Patent: Jun. 18, 2019

(54) SYSTEM AND METHOD FOR THERMOCHEMICAL STORAGE OF ENERGY

(71) Applicant: Nederlandse Organisatie voor toegepast-natuurwetenschappelijk onderzoek TNO, 's-Gravenhage (NL)

(72) Inventors: Adriaan Jan De Jong, 's-Gravenhage (NL); Johannes Christiaan Van 'T Spijker, 's-Gravenhage (NL); Ruud Cuypers, 's-Gravenhage (NL); Hendrik Pieter Oversloot, 's-Gravenhage (NL); Christiaan Franciscus Leonardus Van Soest, 's-Gravenhage (NL); Christian Johannes Finck, 's-Gravenhage (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 0 days.

(21) Appl. No.: 15/508,020

(22) PCT Filed: Sep. 1, 2015

(86) PCT No.: PCT/NL2015/050604
§ 371 (c)(1),
(2) Date: Mar. 1, 2017

(87) PCT Pub. No.: WO2016/036242
PCT Pub. Date: Mar. 10, 2016

(65) Prior Publication Data
US 2017/0299278 A1     Oct. 19, 2017

(30) Foreign Application Priority Data

Sep. 2, 2014 (EP) ................................. 14183276

(51) Int. Cl.
F25B 17/08      (2006.01)
F28D 17/04      (2006.01)
F28D 20/00      (2006.01)

(52) U.S. Cl.
CPC .......... *F28D 20/003* (2013.01); *F25B 17/083* (2013.01); *F28D 17/04* (2013.01); *Y02E 60/142* (2013.01)

(58) Field of Classification Search
CPC ........ F28D 20/003; F28D 17/04; F28D 20/00; F28D 15/00; F25B 17/083; F25B 17/08;
(Continued)

(56) References Cited

U.S. PATENT DOCUMENTS 1,774,820 A * 9/1930 Williams .............. F25B 17/083
123/41.19
1,897,980 A * 2/1933 Hulse .................... F25B 49/046
62/145

(Continued)

FOREIGN PATENT DOCUMENTS

EP     2674696 A1    12/2013
JP     H05322359 A   12/1993

OTHER PUBLICATIONS

Feb. 10, 2016—International Search Report and Written Opinion of PCT/NL2015/050604.

(Continued)

*Primary Examiner* — Justin M Jonaitis
(74) *Attorney, Agent, or Firm* — Banner & Witcoff, Ltd.

(57) ABSTRACT

The present invention discloses a closed system for thermochemical storage comprising at least one water condenser and at least two thermochemical modules, wherein a first thermochemical module comprises a first thermochemical material and a second thermochemical module comprises a second thermochemical material, and wherein the at least
(Continued)

Figure 1A:
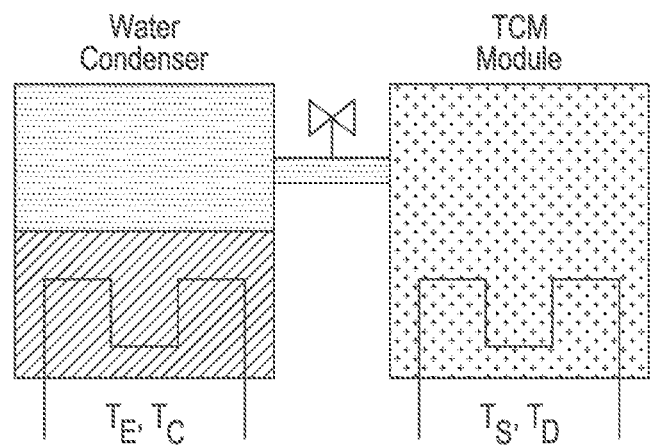

one water condenser and the thermochemical modules are connected so that water vapor can be exchanged individually between any two selected from the list consisting of the at least one water condenser and the at least two thermochemical modules. A method for desorption in the system according to the invention is also described. In this method, the first thermochemical module is used as a condenser to dry the second thermochemical module.

18 Claims, 11 Drawing Sheets

(58) Field of Classification Search
CPC .......... F25B 35/04; F25B 15/00; F25B 17/00; F25B 49/04; F25B 2315/00; F25B 17/04; F25B 49/046; F25B 27/007; F25B 29/006; F25B 30/04; F25B 37/00; F28F 3/02; F28F 13/00; F28F 23/00; H01L 23/3672; H01L 23/46; B60H 1/3201; Y02B 30/62; Y02B 30/64
USPC ......... 165/185, 104.12, 104.11; 62/480, 101, 62/106, 476; 422/109, 162

See application file for complete search history.

(56) References Cited

U.S. PATENT DOCUMENTS

| | | | | |
|---|---|---|---|---|
| 1,982,672 A * | 12/1934 | Koenemann | ........... | C09K 5/047 62/101 |
| 2,638,760 A * | 5/1953 | Mills | ....................... | F25B 15/00 62/112 |
| 5,009,071 A * | 4/1991 | Schwetje | ............... | C09K 5/047 252/67 |
| 5,333,471 A * | 8/1994 | Yamada | ............... | B60H 1/3201 62/476 |
| 5,419,145 A * | 5/1995 | Chandler | ............... | C09K 5/047 252/69 |
| 6,041,617 A * | 3/2000 | Sanada | ................. | F25B 17/083 62/480 |
| 6,427,453 B1 * | 8/2002 | Holtzapple | .......... | B01D 53/265 62/305 |
| 2006/0130652 A1 * | 6/2006 | Takewaki | ............... | B01D 53/28 95/148 |
| 2010/0263832 A1 * | 10/2010 | Dalla Betta | ............... | F01K 3/12 165/104.12 |
| 2012/0251394 A1 * | 10/2012 | Komaki | ................ | F28D 20/003 422/109 |

OTHER PUBLICATIONS

P. Tatsidjodoung, N. Le Pierrès and L. Luo, «A review of potential materials for thermal energy storage in building applications», Renew. Sustain. Energy Rev., vol. 18, No. 0, p. 327-349.

* cited by examiner

SYSTEM AND METHOD FOR THERMOCHEMICAL STORAGE OF ENERGY

CROSS-REFERENCE TO RELATED APPLICATIONS

This application is a U.S. National Stage application under 35 U.S.C. § 371 of International Application PCT/NL2015/050604 (published as WO 2016/036242 A1), filed Sep. 1, 2015, which claims the benefit of priority to EP 14183276.6, filed Sep. 2, 2014. Benefit of the filing date of each of these prior applications is hereby claimed. Each of these prior applications is hereby incorporated by reference in its entirety.

The invention relates to the area of seasonal heat storage and systems and materials useful therefor.

There is a growing interest for the use of thermal solar collectors to obtain energy that can be used for various needs in houses, and particularly for space heating and provision of hot water. As an estimation, an area of 10-20 m$^2$ of solar panels would be sufficient for the annual heat demand of about 20 GJ of a good isolated dwelling, provided that the surplus could be used for the deficit in the winter. This requires storage of about 10 GJ. If this is stored in a hot water tank, this would need about 50 m$^3$ (for a tank at 90° C.), which would be too big for domestic applications. An attractive alternative is to store heat by drying thermochemical materials (TCM) with an excess of solar heat from e.g. solar collectors in the summer. In the winter, it is then possible to hydrate the TCM and in this way to release the heat.

In general, thermochemical heat storage (TCS) is based on thermally reversible reactions such as:

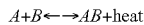

$$A+B \leftrightarrow AB + \text{heat}$$

The reaction may contain more compounds and is not restricted to two compounds A and B. For the above reaction, the charging process to store the energy is an endothermic reaction wherein heat is supplied to split compound AB into compounds A and B. The energy is released in the form of heat when A and B are brought together (discharging process). A can be referred to as a sorption material (or sorbent), B is a working fluid (or sorbate), AB is working fluid adsorbed (or absorbed) on the sorption material. A and B can also both be fluid.

These reaction are also called sorption and desorption reactions. In case of water being one of the compounds A or B, these are hydration or dehydration reactions, for example:

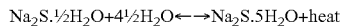

$$Na_2S \cdot \tfrac{1}{2}H_2O + 4\tfrac{1}{2}H_2O \leftrightarrow Na_2S \cdot 5H_2O + \text{heat}$$

This sorption or hydration reaction provides for a high energy density of about 2.7 GJ per m$^3$ of $Na_2S \cdot 5H_2O$, whereby the heat for evaporation is supplied from an external source. TCM do not only have a higher heat storage compared to hot water storage, but also do not require thermal insulation. One only needs to keep chemical components separate, in the above case dried sodium sulfide and water, which is ideal for seasonal storage.

There are however some problems in the use of TCM for thermochemical heat storage. For example, zeolite and silica, although being stable for many cycles of hydration and dehydration, they have a relatively low storage density for drying at a typical solar collector temperature of 90° C. (and for typical condenser, evaporator and sorption temperatures). With hygroscopic salts, higher storage densities to 1-2 GJ/m$^3$ are possible but for these materials undesirable processes could play a role especially at higher temperatures, such as melting, coagulation, volume changes during hydration or dehydration, scaling, corrosion, decomposition, and other undesirable chemical side reactions.

The present invention aims to provide a system and a method for thermochemical storage of heat having one or more of the following advantages: (1) high storage density at a given desorption temperature, which is preferably with a factor higher than that of zeolite, (2) low desorption temperatures, so that the negative effects mentioned hereinabove are reduced or disappear.

In order to address at least some of the above desires, the present invention provides, in one aspect, a closed system for thermochemical storage comprising at least one water condenser and at least two thermochemical modules, wherein a first thermochemical module comprises a first thermochemical material and a second thermochemical module comprises a second thermochemical material, and wherein the at least one water condenser and the thermochemical modules are connected so that water vapour can be exchanged individually between any two selected from the list consisting of the at least one water condenser and the at least two thermochemical modules.

In another aspect, the present invention provides a method for desorption in a system for thermochemical storage according to the invention, comprising a step wherein the desorption in the second thermochemical module is realized using at least the first thermochemical module as a condenser.

Under "condenser" throughout this specification and the claims a module is understood that is capable of generating and—in reverse—accommodating water vapour. Condenser can for example be a water condenser, which contains liquid water as the source of the water vapour. However in certain use modes, a thermochemical module can be used as a condenser. Condenser can typically operate in two modes—(1) generating water vapour (evaporating mode) and (2) absorbing/accommodating of water vapour (drying mode). Water condenser is typically provided with a heat source to control the temperature of the condenser.

A thermochemical (TCM) module is a module containing thermochemical material. A thermochemical module is typically provided with a heat source (heat exchanger), in order to control the temperature of the module. Thermochemical materials are able to undergo reversible reactions wherein sorption of a certain compound is associated with heat release. Typical thermochemical materials are known to a skilled person and are for examples salts, hydrates releasing heat when reacting with water to form (higher) hydrates, as exemplified above. An overview of some thermochemical materials is presented in P. Tatsidjodoung, N. Le Pierrés and L. Luo, «A review of potential materials for thermal energy storage in building applications», Renew. Sustain. Energy Rev., vol. 18, n. 0, p. 327-349, February 2013. Generally, thermochemical materials can be divided into a group of sorption phenomena materials, e.g. zeolites, in which the sorbate is physically adsorbed and/or absorbed by the material, and chemical reaction materials, e.g. oxides/hydroxides and hydrate-forming salts, wherein the sorbate is chemically bonded to the material. In the latter case the sorption leads to the formation of another chemical compound (hydroxide from a respective oxide) or the sorbate is included into the crystal structure of the material, e.g. forming a hydrate. Particularly preferred in the present invention are the thermochemical materials that react with water (vapour) as the sorbate to release heat.

Prior art methods can be illustrated based on FIG. 1A. In this figure a system is shown comprising a water condenser and one TCM module, connected through a valve for water vapor with the water condenser. To charge the thermochemical storage, the thermochemical module is heated (e.g. heat from solar collectors) at a desorption temperature $T_D$ to release a certain amount of water vapour. The vapor produced thereby is condensed in the water condenser at a condensation temperature $T_C$ and the associated waste heat is released. The condensed water and dehydrated sorbent are stored in separate tanks at ambient temperature. As long as these agents are not put in contact again, no heat losses occur.

For the heat release, the water stored in the water condenser is vaporized at an evaporation temperature $T_E$ using a heat source. The vapor is then absorbed by the dehydrated sorbent in the TCM module at a sorption temperature $T_S$ releasing its enthalpy of absorption. The thereby generated heat is used, e.g. for space heating or domestic hot water production.

When water condenser is used to dry the TCM module as in FIG. 1A, and it is a water condenser at an ambient temperature, for example 30° C. in the summer, then the saturation vapor pressure of 42 mbar of water at 30° C. is limiting for the whole process. This vapour pressure in fact determines how much heat can be stored. In most cases, this means that the TCM cannot be completely dried without increasing the temperature $T_D$. However, increasing the temperature $T_D$ can be difficult or unpractical. For example, a typical desorption temperature that can be realized using solar collectors is 90° C. It is difficult to use a higher temperature when water is used as the heat exchange medium as the water will start to boil.

The present invention is based on a judicious insight that it is possible to use a lower desorption temperature by using an earlier dried TCM module instead of using a water condenser with a water surface. In this way, (1) TCM can be much further dried at a given temperature $T_D$, resulting in a much higher storage density or (2) TCM can be dried at a lower temperature $T_D$ while maintaining the same energy storage density. The procedure can be extended to multiple stages of drying. If a collection of TCM modules is used, then the modules can dry each other in steps. There are several strategies for multistage drying possible, some of which will be explained in more details herein-below.

In the multistage thermochemical storage according to the invention, a TCM module is subjected to hydration/dehydration at the same temperature with another TCM module, instead of with the evaporator/condenser of water vapor. In this way, completely dry TCM, e.g. Z13X with water loading (B) nearly 0 is possible to achieve without increasing the temperature $T_D$, or even at a lower $T_D$. For the $2^{nd}$, $3^{rd}$ and further stages, the TCM module can be used at $T_C$ as a condenser.

In some embodiments, the thermochemical material used in the method of the present invention is selected from the group consisting of zeolites, silica gel, hygroscopic salts, metal-organic frameworks (MOF), carbon, and aluminum phosphates. In some preferred embodiments, the thermochemical material is a sorption phenomenon material, such as zeolites, silica gel, MOF, carbon and aluminum phosphates. An advantage of such materials is that they typically do not swell/shrink during (de)sorption and therefore exhibit a rather good stability during recycling. A disadvantage is however that sorption phenomenon materials usually have a rather low heat storage density. In other preferred embodiments, the thermochemical material used in the method is a chemical reaction material, e.g. hygroscopic salts. Salts possess a rather high heat storage density but the sorption/desorption processes are likely to disrupt the crystal structure, which leads to a lower recycling stability. The hygroscopic salts are usually capable of forming hydrates. Preferably, the hygroscopic salt is selected from the list consisting of chlorides, sulfates, iodides, nitrates, sulfides and its hydrates. Examples are sodium sulfide, magnesium chloride and its hydrates. In some embodiments, it is preferred to use thermochemical materials that allow multistage sorption/desorption, e.g. salts that form several hydrates. In some embodiments, the thermochemical material is in the solid form.

In some embodiments, the multiple thermochemical modules comprise the same thermochemical material. In other embodiments, the modules may comprise different thermochemical materials. For example, one thermochemical module may comprise a sorption phenomenon material, and the other one a chemical reaction material. In one of the embodiments, the thermochemical module used as a condenser contains silica gel, while the other thermochemical module contains a hygroscopic salt. In another embodiment, both TCM modules contain a hygroscopic salt.

Also the weight of the thermochemical material can be varied. In some embodiments, the thermochemical modules contain the same amount of the thermochemical material, while in other embodiments it can be advantageous to use more material in one of the TCM modules, e.g. in the one which works as a condenser. This means that the TCM modules may have the same or different volumes. In some embodiments, it is preferred to use identical TCM modules having the same volume and the same thermochemical material.

Figure 1B:
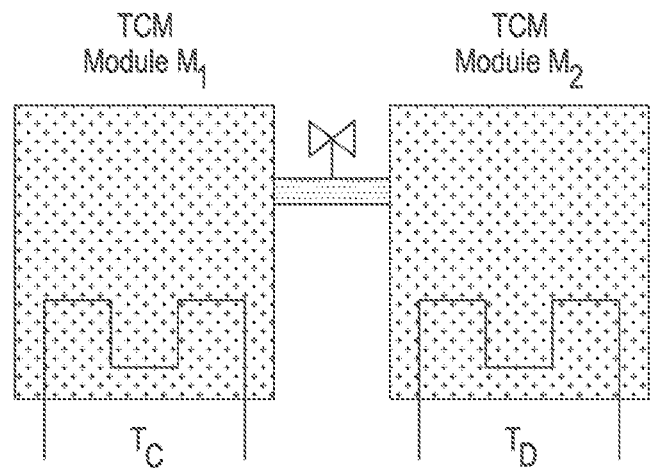

A system according to the invention with two stages (two modules) is illustrated in FIG. 1B. Instead of a water condenser another TCM module $M_1$ is used. The TCM modules are connected using a duct and a valve. In this embodiment, TCM module $M_2$ is subjected to hydration/dehydration at the same $T_D$ with another TCM module $M_1$, instead of with the evaporator/condenser of water vapor. For practical purposes, the system should further comprise a water condenser (not shown) that can be used to dry the TCM module used as a condenser.

The system is not limited to two TCM modules; more than two TCM modules can be used. In some embodiments, three TCM modules are used. Also more than one water condenser can be used, which may be advantageous in certain embodiments.

In a preferred embodiment, the at least one water condenser and the TCM modules are all connected in such a way that predetermined condensers and/or modules could be brought into contact independently of each other. Particularly, the connection is such as to allow individual connections between any two modules, wherein the modules are selected from the list consisting of the at least one water condenser and the at least two thermochemical modules. In other words, the system according to the invention allows exclusive connections between the thermochemical modules (any combinations of two modules), but also between a TCM module and a water condenser, and also between water condensers (in case there are more than one). Exclusive connection means that there is no water vapour transfer with the other modules/water condensers except between those forming the exclusive connection. These can be two modules, but also three or more.

The possibility of forming exclusive connections between any combinations of modules is an important characteristic of the system according to the present invention and makes it possible to realize the method for desorption/sorption according to the invention wherein one thermochemical module is dried using another thermochemical module. Exclusive connections allow a great flexibility and particularly, allow to use TCM modules in different roles. The same TCM module can be first hydrated using a water condenser but in another step the TCM module is used as a condenser itself, when connected to another TCM module. Similarly, the present system allows a connection in which one TCM module (or modules) operates in a sorption mode thereby adsorbing water vapour, while another TCM module (or modules) operates in a desorption mode thereby generating water vapour.

The above described property of exclusive connections can be realized by providing a connection system wherein each water condenser and each TCM module has a connection through a valve with a central tube. Such central tube can also have a ring (loop) form. The connection and the central tube allow the exchange of vapour between different modules. By selectively opening and closing the valves, different connections between the condenser(s) and TCM modules can be realized.

Figure 9:
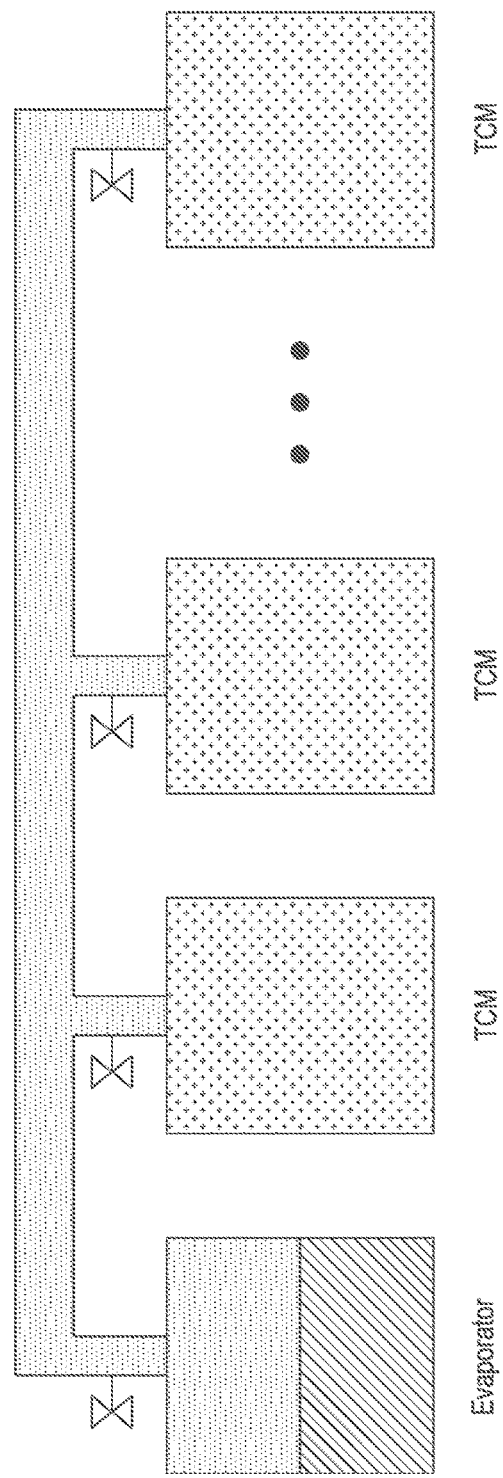

An example of such connection system is shown in FIG. 9. The central tube can have different configurations, it may be linear as in FIG. 9 but can also be in the form of a ring or loop. Use of a tube to connect different pieces of equipment is flexible in application as it allows different configurations to be realized. For example, it allows to connect and realize water vapour exchange between one selected TCM module and a water condenser, but also between two TCM modules, and even between three TCM modules. The latter case can be useful in an embodiment wherein two TCM modules are used to dry a third TCM module (described herein-below in more detail).

Initially, the central tube can be evacuated to a reduced pressure, more preferably vacuum. This can be done when all valves of the condenser(s) and TCM modules are closed. For example, this could be done when in between the steps of bringing into contact of selected condenser(s) and/or TCM modules by opening the respective valves. Bringing the central tube to vacuum (e.g. under 0.01 mbar) has an advantage that the vapour pressure equilibrium is set more precisely.

In an interesting embodiment, two TCM modules can be used simultaneously to dehydrate a third TCM module. This has as an advantage that higher dehydration degrees can be reached.

In a further aspect, the present invention provides a method for desorption in a system for thermochemical storage according to the invention, wherein the desorption in the first thermochemical module is realized using the second thermochemical module as a condenser, instead of a water condenser.

This method can be illustrated on the two module system depicted in FIG. 1B. Both modules $M_1$ and $M_2$ are heated up to a certain temperature $T_D$, using a heating source. Then the valve is closed to prevent the exchange of water vapour between the modules. The left module, $M_1$, is then cooled down to the temperature $T_C$ (part of that energy can be collected in the heat exchanger). The right module $M_2$ still has the temperature $T_D$. In the next step, the valve is open and the water vapour can be exchanged. Because of a difference in water vapour pressure in the modules, a new water vapour pressure will be set, which is equal in both $M_1$ and $M_2$. This will lead to the transport of an amount of water vapour from $M_2$ to $M_1$. Effectively, the $M_2$ module will be dried and the $M_1$ module will accommodate the water vapour thus working as a condenser.

As will be illustrated in the examples, the advantage of this type of drying is that the same (lower) water loading B of the TCM in $M_2$ can be achieved at a lower temperature $T_D$ than if a water condenser was used instead of $M_1$.

The possibility to use lower desorption temperatures mean more advantages. First of all, more types of TCM can be used, as some of these materials tend to show instability at higher temperatures. Further, at lower collector temperatures (e.g. 70° C. instead of 90° C.) the heat loss of solar collectors to ambient is lower, and lower collector temperatures are reached more often, so that TCM can be dried more often.

The TCM modules typically comprise a heat exchanger that allows to bring the module at a required temperature—for example $T_D$ or $T_C$. The heat released in the TCM module used as a condenser (e.g. $M_1$ in FIG. 1B), can be collected through a heat exchanger present in that module. Heat exchangers using concurrent flow allow to recover theoretically up to 50% of the released heat. If countercurrent flow is used, theoretically up to 100% of the released heat can be collected.

Since the processes of sorption and desorption are interrelated, the present invention can equally be used as a method for sorption in a system for thermochemical storage according to the invention, wherein the sorption in the first thermochemical module is realized using the second thermochemical module as an evaporator, instead of a water evaporator. The advantage of this is that higher sorption temperatures in the second thermochemical module can be realized.

Figure 10:
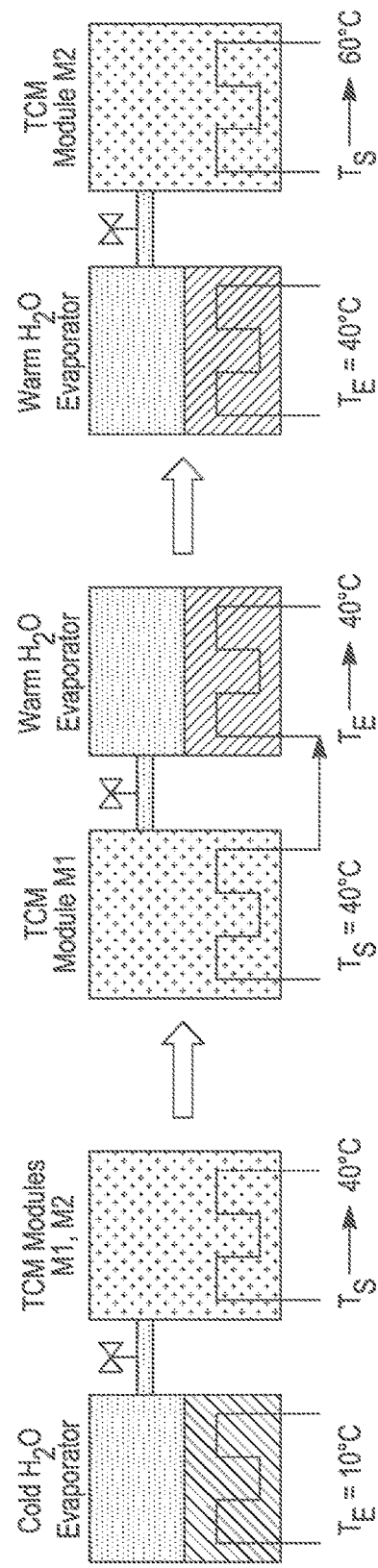

In a separate embodiment of the present invention, the step of sorption using a thermochemical module as an evaporator can also be realized through an intermediate water evaporator. FIG. 10 illustrates such an embodiment. This embodiment includes the use of a cold water evaporator and a warm water evaporator and further of two TCM modules $M_1$ and $M_2$. The role of the cold and warm water evaporators can also be fulfilled by the same evaporator. The embodiment can realize a higher temperature of sorption (60° C. instead of 40° C.). An example of a method, wherein such configuration is used is discussed in Example 8.

The system and the method described above are particularly useful for heat storage, preferably for seasonal heat storage.

The invention makes it also possible to modify an existing system for thermochemical storage of energy, comprising a water condenser and one TCM module, by adding at least one additional TCM module. In a preferred embodiment, the additional TCM module is connected to both the water condenser and the existing TCM module. This allows the additional TCM module to be used as a condenser for the existing TCM module, and to dry the additional TCM module, in turn, using the water condenser. Also other configurations are possible, as described above.

For the purpose of clarity and a concise description features are described herein as part of the same or separate embodiments, however, it will be appreciated that the scope of the invention may include embodiments having combinations of all or some of the features described.

The invention will now be illustrated in the following, non-limiting examples. Parts and percentages mentioned in the examples and through the description, are by weight, unless otherwise indicated. The sorption and desorption processes are illustrated using vapour pressure diagrams, which are described by the Clausius-Clapeyron equation:

$$dp/dT = \Delta h / T \Delta v,$$

wherein p is the sorbate (water) pressure, T temperature, Δh molar enthalpy and Δv molar volume differences between the phases of the sorbate. In the examples, the following annotations are used: $T_E$ evaporation temperature, $p_E$ evaporation vapor pressure, $T_S$ sorption temperature, B water loading (g water/g material), $T_C$ condensation temperature, $p_C$ condensation vapour pressure, $T_D$ desorption temperature.

EXAMPLES

Example 1 (Comparative)

Singe Stage Thermochemical Storage with a Zeolite Used as TCM

In this example, Zeolite 13X is used as TCM and water as a sorbate. The system used is depicted in FIG. 1A.

Figure 2:
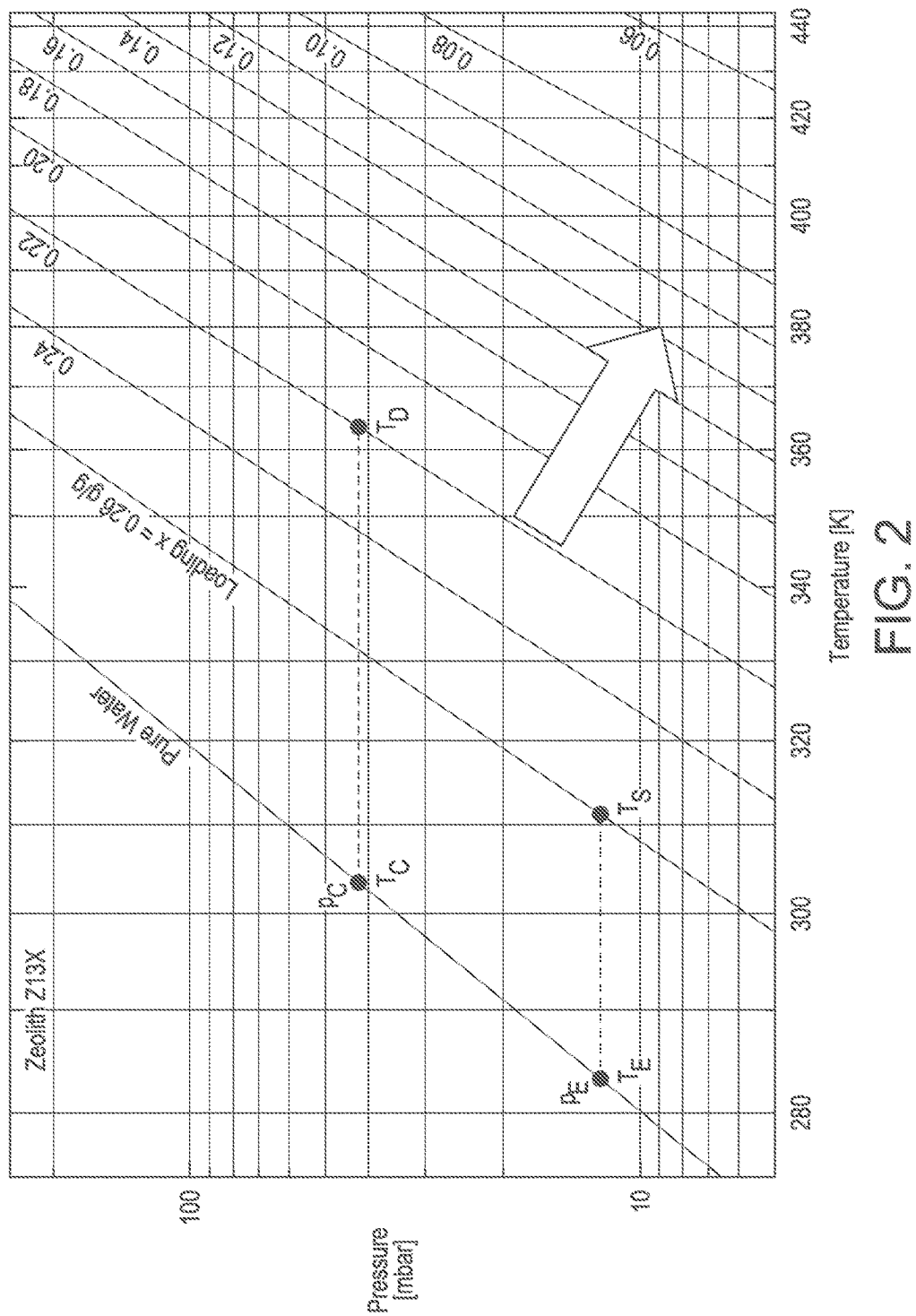

The water vapour diagram is presented in FIG. 2. In this diagram, several curves are present. The most left curve corresponds to the pure water vapour diagram, which corresponds to the conditions in the water condenser. Other curves correspond to the water vapour in a system with Zeolite Z13X with different water loadings B—particularly, from left to right, the curves are shown for B=0.26, 0.24, 0.22, 0.20, 0.18 g/g, etc.

The TCM module loaded with the zeolite is desorbed at $T_D$=90° C., which is a typical temperature when solar collectors are used to supply heat. The released water vapour is condensed in the water condenser at $T_C$=30° C., $p_C$=42 mbar. This corresponds to B=0.22 g water/g zeolite.

For the sorption reaction, water vapour is evaporated in the water condenser at $T_E$=10° C., $p_E$=12 mbar, and the zeolite is allowed to adsorb water vapour at $T_S$=40° C., leading to B=0.26 gw/gz. The difference in water loading ΔB=0.04 gw/gz, which indicates how much heat can be stored. This difference of 0.04 gw/gz corresponds to storage density Q/M=0.12 GJ/ton zeolite, or Q/V=0.084 GJ/m³ zeolite.

For further desorption of the zeolite, to lower B values, a higher $T_D$ is necessary, which is indicated by the arrow in FIG. 2.

Example 2 (Comparative)

Higher Thermochemical Storage, One Stage

Figure 3A:
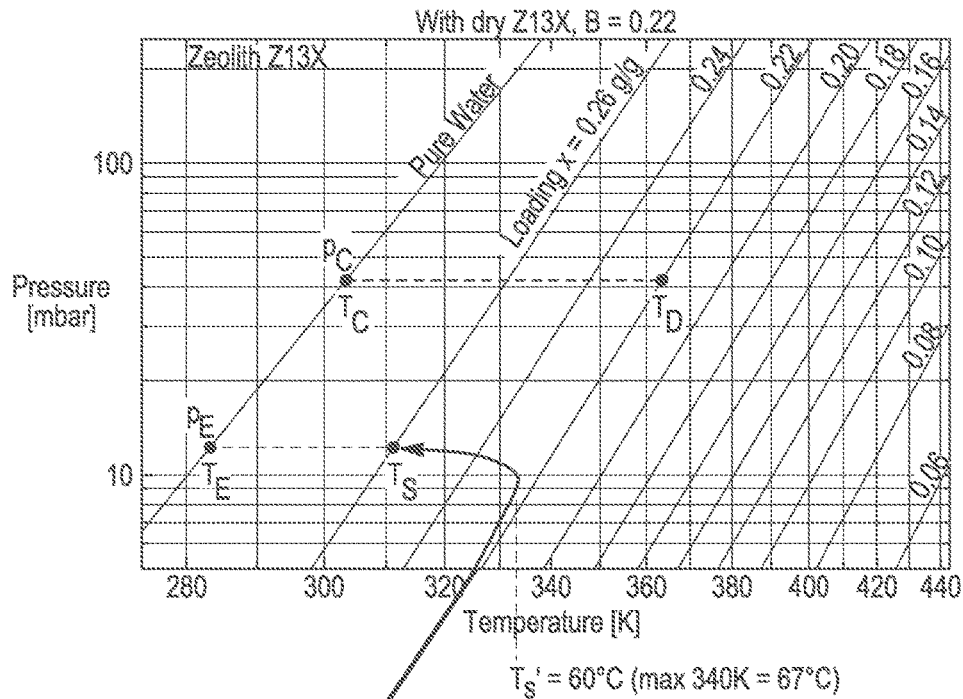

In this example, the purpose was to obtain higher output temperatures with Zeolite 13X as TCM with thermochemical storage in one stage. The vapour pressure diagrams are shown in FIGS. 3A and B.

Typically, the temperature needed for domestic hot water (DHW) is 60° C., while for space heating (SH) −40° C.

Figure 3B:
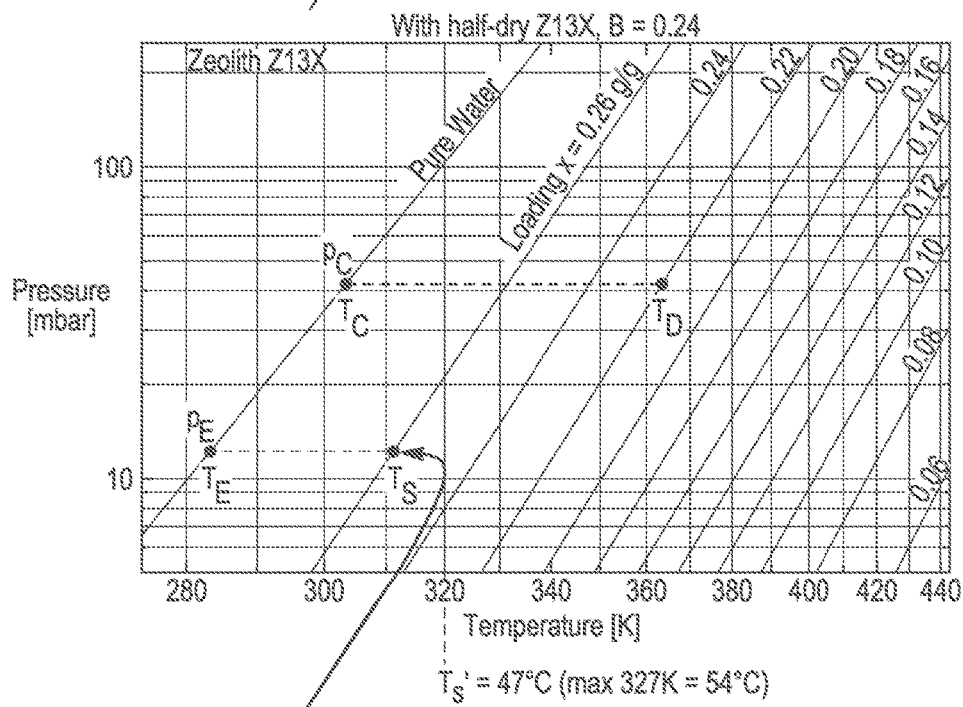

As can be seen from the figures, these conditions were possible to achieve with dry Zeolite 13X (see FIG. 3A, maximum sorption temperature 340 K=67° C.), but not with half-dry Zeolite 13X (see FIG. 3B, maximum sorption temperature 327 K=54° C.).

The 60° C. heat should be stored separately, or in stratified boiler (but not for long, as stratification disappears by heat conduction).

Example 3

Two Stage Thermochemical Storage

Figure 4:
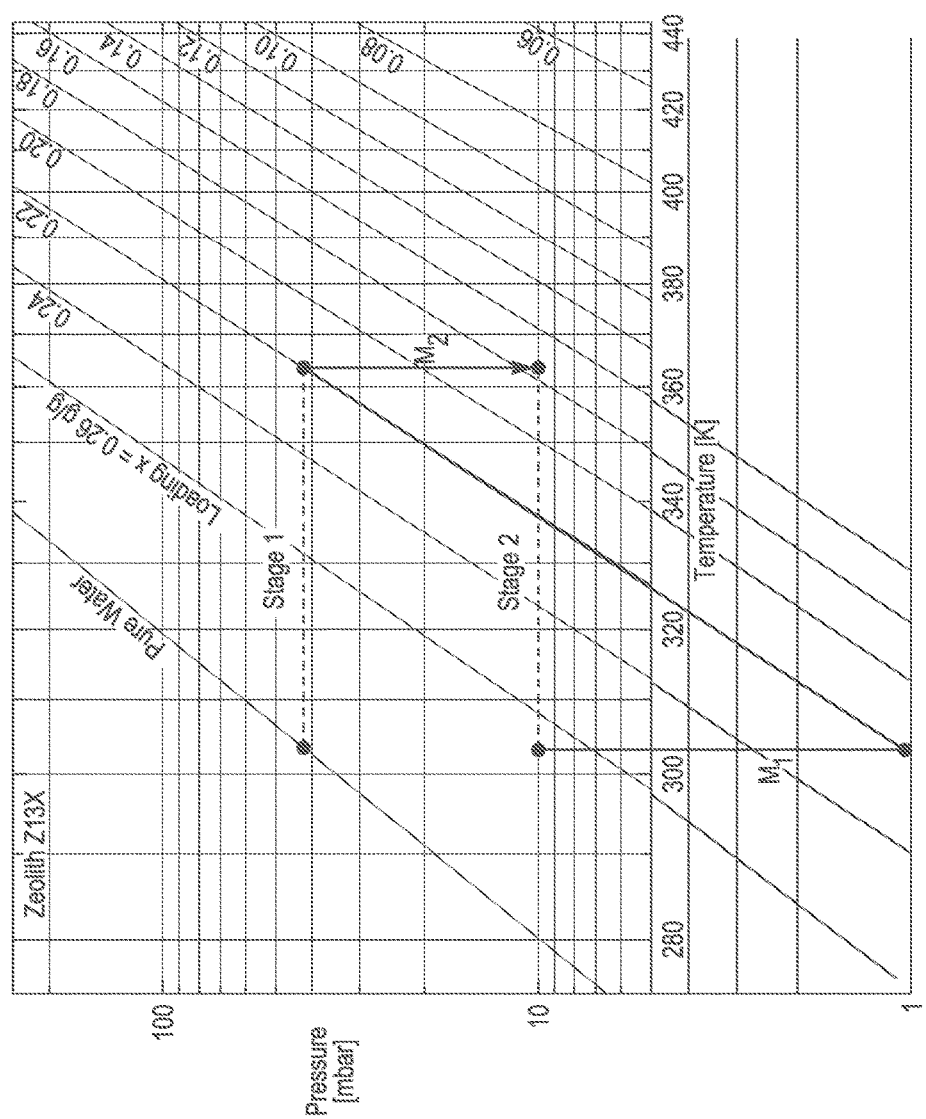

In this example, two identical Z13X modules $M_1$, $M_2$ loaded with the same amount of Zeolite Z13X as the TCM are used as depicted in FIG. 1B. The modules and the water condenser are connected through a central tube as explained herein-above. The water vapour diagrams are shown in FIG. 4.

In a first step, both modules are dried at $T_D$=90° C. with water condenser operating at $T_C$=30° C. After that the valve between $M_1$ and $M_2$ is closed. $M_1$ is cooled down to 30° C., while $M_2$ is kept at 90° C. The heat released in $M_1$ can be regained by heat exchange, e.g. with another module (<50% for concurrent and <100% for countercurrent heat exchange).

Subsequently, the valve is opened and an pressure equilibrium takes place, which leads to the drying to $M_2$ with $M_1$. $\Delta B_2 = -\Delta B_1 = -0.045$ at $p_{eq2} = p_{eq1} = 10$ mbar. Finally, $M_2$ reaches water loading B=0.175 gw/gz. In total ΔB=0.085 gw/gz is stored, which corresponds to storage density Q/M=0.255 GJ/tz.

Example 4

Three Stage Thermochemical Storage

Figure 5:
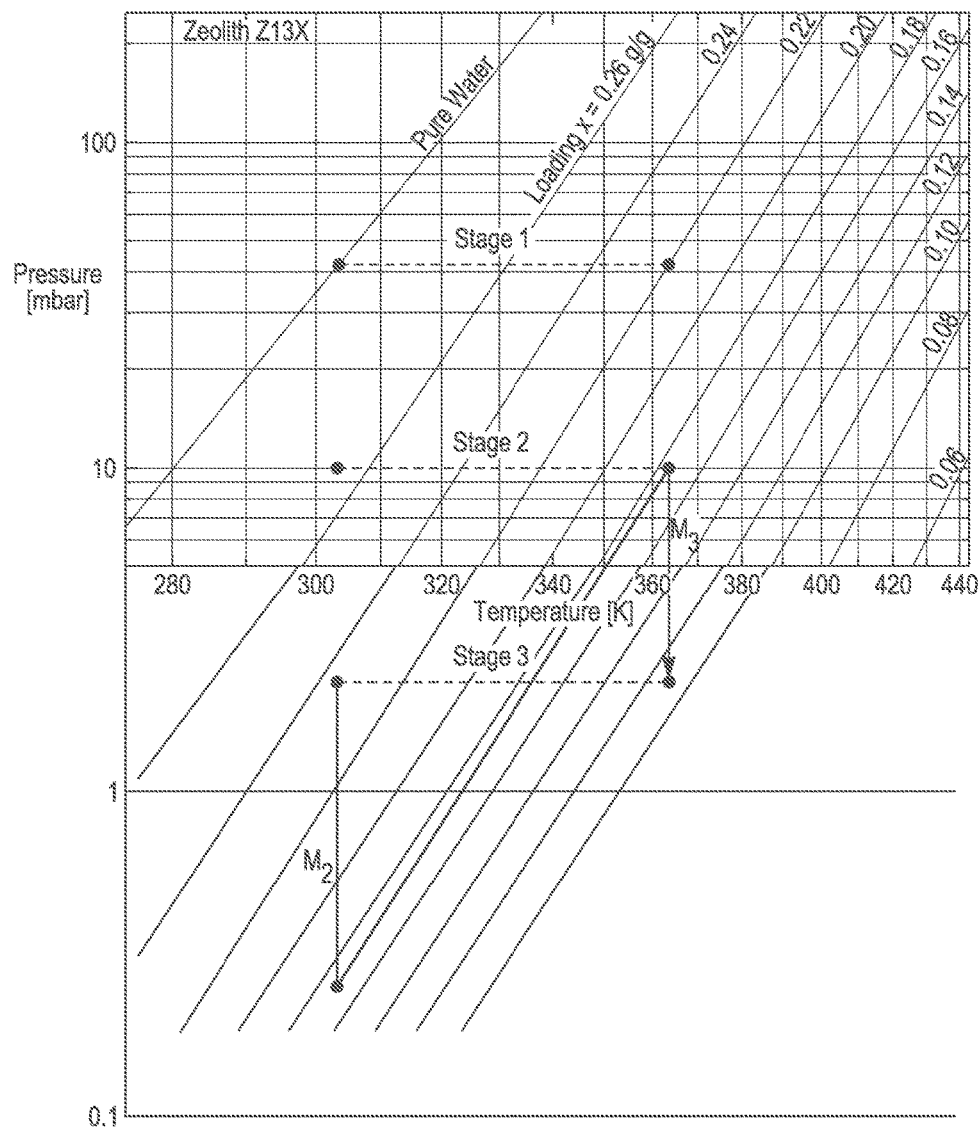

In this example three identical modules $M_1$, $M_2$, $M_3$ loaded with the same amount of Zeolite Z13X as the TCM are used. The modules and the water condenser are connected through a central tube as explained herein-above. The water vapour diagrams are shown in FIG. 5.

All the modules are first dried at $T_D$ 90° C. with the water condenser at $T_C$=30° C. After that, modules $M_2$, $M_3$ are dried with $M_1$ to B=0.175 gw/gz at $p_{eq2} = p_{eq1} = 10$ mbar, as in Example 3. In a further step, $M_3$ is dried with $M_2$ which leads to $\Delta B_3 = -\Delta B_2 = -0.065$ and equilibrium when $p_{eq3} = p_{eq2} = 2$ mbar. Finally, $M_3$ reaches the water loading B=0.11 gw/gz. In total ΔB=0.15 gw/gz is stored, which corresponds to storage density Q/M 0.45 GJ/tz.

Example 5

Different TCM Materials: Zeolite Z13X and SG125

In this example, two TCM modules are used with different materials. One module uses Zeolite Z13X and the other one Silicagel Grace 125 of equal mass. The module with SG125 is used here as a condenser for the zeolite module. The modules and the water condenser are connected through a central tube as explained herein-above.

Figure 6:
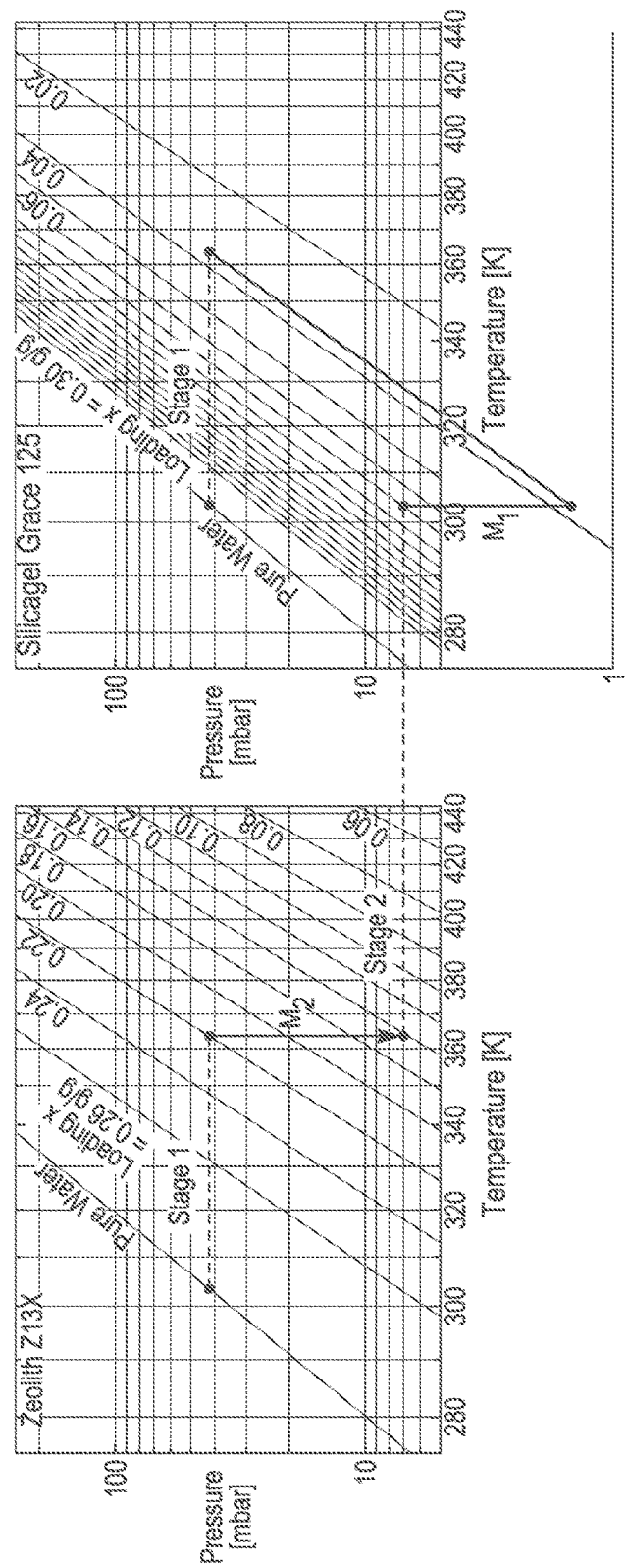

The vapor pressure diagrams are shown in FIG. 6, wherein the left diagram is for Zeolite Z13X and the right diagram for SG125.

As can be seen from FIG. 6, SG125 absorbs more $H_2O$ at lower $T_C$ with lower increase of $p_{eq}$. When the Z13X module is dried with the SG125 module, $\Delta B_2 = -\Delta B_1 = 0.06$ gw/gz. In two stages 0.1 gw/gz~0.30 GJ/tz.

Example 6

Different TCM Materials: $Na_2S$ and SG125

Figure 7:
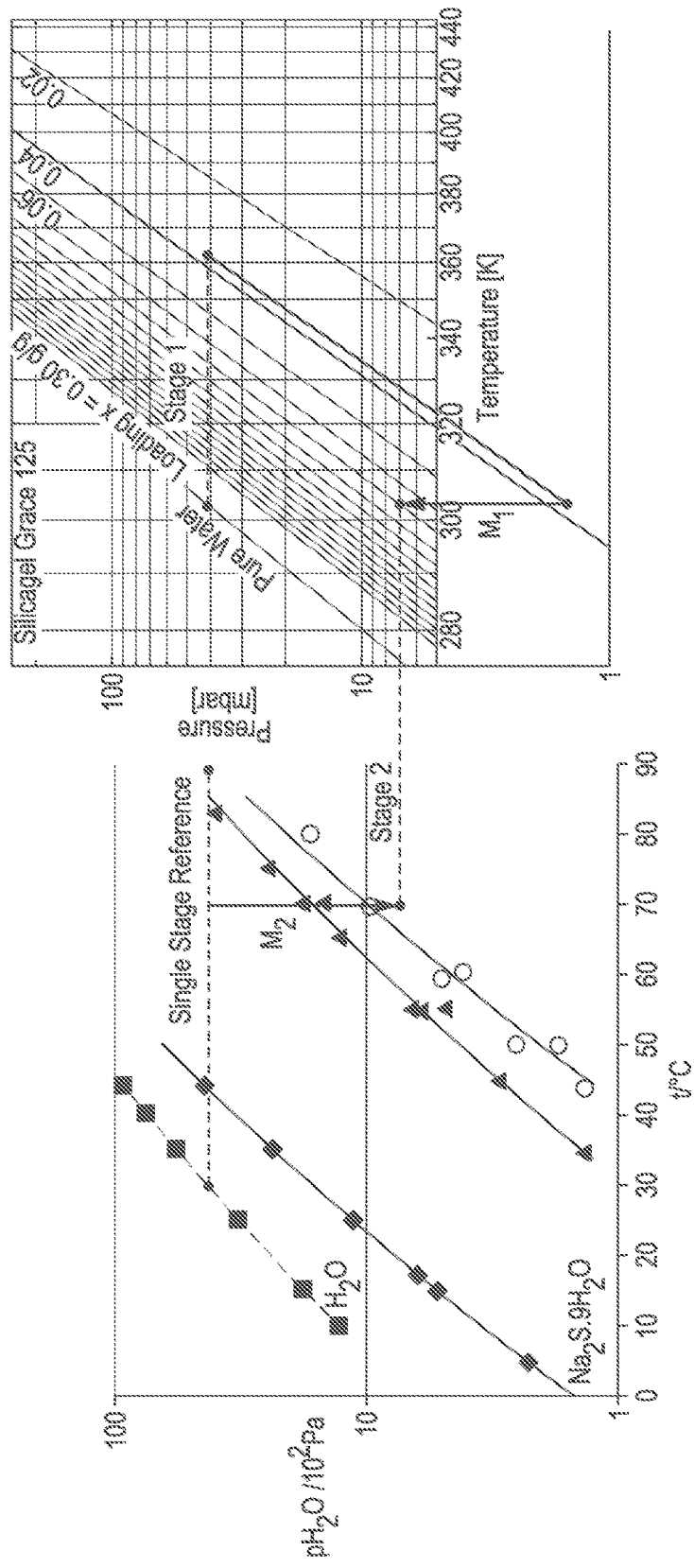

In this example, a TCM module with hygroscopic salt $Na_2S$ is dried using a silica gel containing module. The modules and the water condenser are connected through a central tube as explained herein-above. The vapor pressure diagrams are shown in FIG. 7, wherein the left diagram is for $Na_2S$ and the right diagram for SG125.

A peculiarity of vapour pressure diagrams for salts able to form hydrates is that there are less curves with different water loadings, since the hydration states are limited to the number of existing hydrates. In this case, the diagram for SG125 present nearly a continuum of vapour pressure curves, while the diagram for $Na_2S$ only shows three curves corresponding to the formation of hydrates $Na_2S.9H_2O$, $Na_2S.5H_2O$ and $Na_2S.2H_2O$. The most left curve shown is for pure water vapour.

This system allows to carry out desorption of $Na_2S$ at 70° C. instead of >90° C. with e.g. SG125.

As an example of a suitable configuration, a single, large SG125 condenser can be used for large stock of compact $Na_2S$ modules.

Example 7

Multiple Stages of $MgCl_2$

Figure 8:
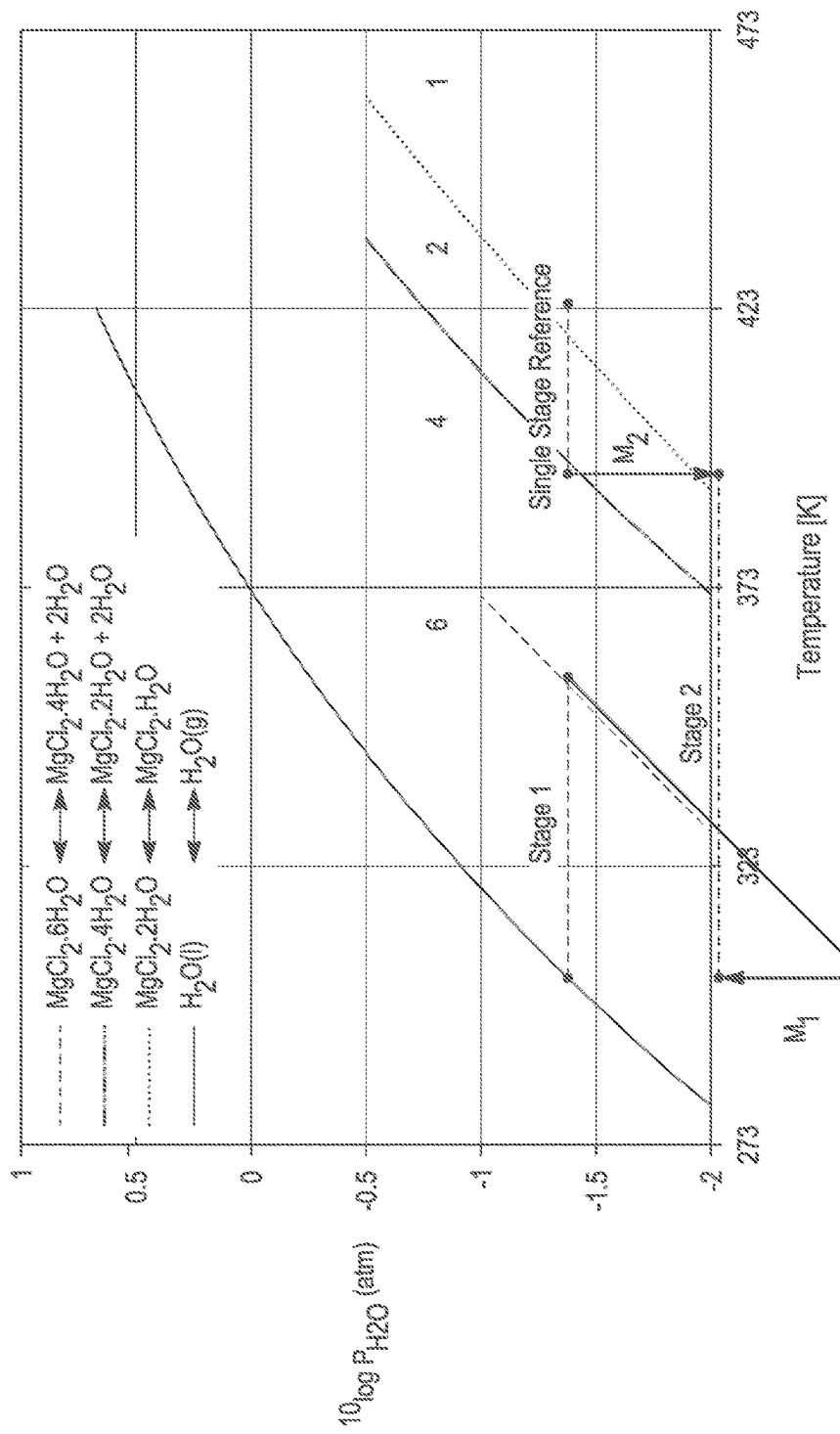

In this example, the same thermochemical material $MgCl_2$ is used in different TCM modules. The modules and the water condenser are connected through a central tube as explained herein-above. FIG. 8 shows water vapour pressure curves for water (most left curve) and different hydration states of $MgCl_2$. (from left to right—formation of $MgCl_2.6H_2O$, $MgCl_2.4H_2O$, $MgCl_2.2H_2O$ hydrates).

The method of the invention can be realized as a two stage desorption of $MgCl_2.(6 \rightarrow 4 \rightarrow 1)H_2O$ at $T_D=120°$ C. instead of 150° C. This can also be performed as a two stage desorption of $MgCl_2.(6 \rightarrow 4 \rightarrow 2)H_2O$ at $T_D=100°$ C. instead of 130° C. Another option is a three stage desorption $MgCl_2.(6 \rightarrow 4 \rightarrow 2 \rightarrow 1)H_2O$ at 100° C.

Therefore, a lower desorption temperature can be used than when one stage desorption is performed (see "single stage reference" in FIG. 8). This is particularly important for $MgCl_2$, which is unstable at higher temperatures.

Example 8

In this example a sorption method is illustrated that allows to achieve a higher temperature $T_S$, which in turn can be used for higher heat needs such as DHW (60° C.). In this example use is made of TCM modules $M_1$ and $M_2$ and a water condenser, which works as a water evaporator. The modules and the water condenser are connected through a central tube as explained herein-above.

FIG. 10 shows separate steps of this method. In the first step (left picture) the TCM modules $M_1$ and $M_2$ are hydrated by water vapour supplied from a cold water evaporator ($T_E=10°$ C.). During hydration heat is released, which brings the TCM modules at the temperature $T_S$ 40° C. In a second step (picture in the middle), one TCM module $M_1$ is brought in contact with a warm water evaporator (which can be the same of different as the cold water evaporator) and heats the evaporator up to $T_E$ 40° C. In the next step (right picture), the warm water evaporator is contacted with the second TCM module $M_2$ to hydrate that module further, which leads to the heating of that module to $T_S=60°$ C. This temperature is sufficient for typical needs for hot water (DHW).

Figure 11A:
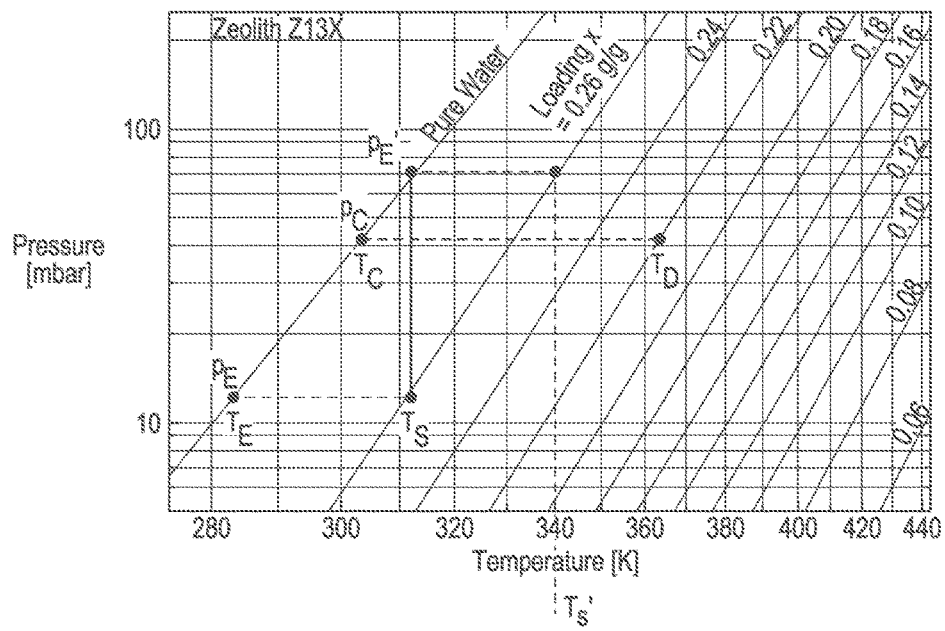
Figure 11B:
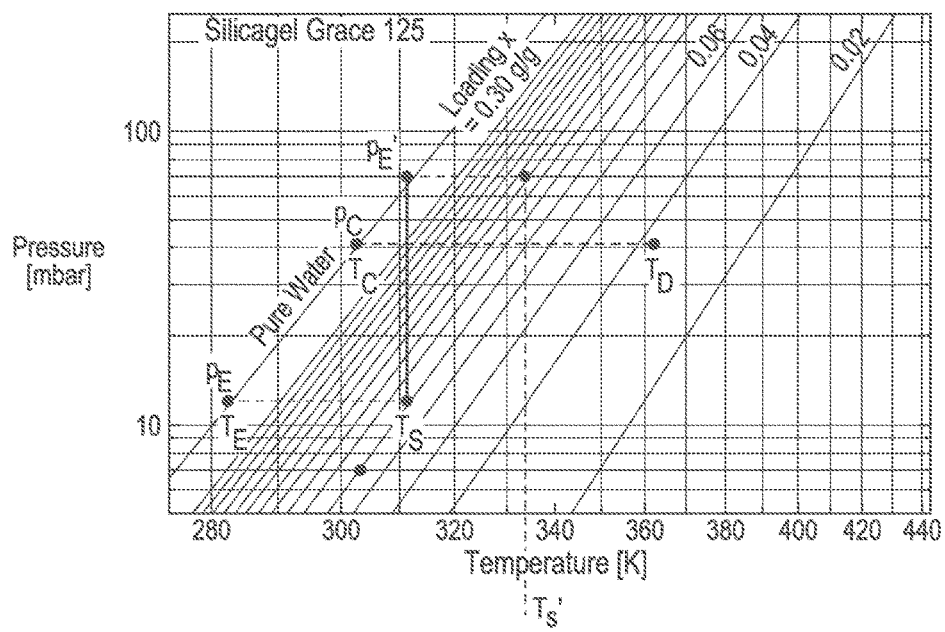

FIG. 11 shows the water sorption diagrams in case zeolite Z13X (FIG. 11A) or SG125 (FIG. 11B) is used as the thermochemical material. FIG. 11A shows that for Z13X it is possible to reach $T_S'=340$ K with water loading B=0.26. FIG. 11B shows that for the silica gel $T_S'=333$ K can be reached with water loading B=0.16.

This example shows that with two TCM modules it is possible to reach a higher sorption temperature, which can be sufficient for DHW needs.

The invention claimed is:

1. Closed system for thermochemical storage comprising at least one water condenser and at least two thermochemical modules, wherein a first thermochemical module comprises a first thermochemical material and a second thermochemical module comprises a second thermochemical material, wherein the at least one water condenser and the thermochemical modules are connected so that water vapour can be exchanged individually between any two selected from the group consisting of the at least one water condenser and the at least two thermochemical modules, and
    wherein the first thermochemical material and the second thermochemical material are hygroscopic salts.

2. The system according to claim 1, further comprising a connection system wherein each condenser and each thermochemical module has a connection through a valve with a central tube.

3. The system according to claim 1, wherein the first and the second thermochemical material are different materials.

4. The system according to claim 1, wherein the hygroscopic salts are independently selected from the group consisting of chlorides, sulfates, iodides, nitrates, sulfides and its hydrates.

5. The system according to claim 1, comprising further a third thermochemical module comprising a third thermochemical material.

6. Method for performing a desorption in a system for thermochemical storage according to claim 1, comprising a step wherein the desorption in the second thermochemical module is realized using at least the first thermochemical module as a condenser.

7. The method according to claim 6, comprising a further step, wherein the desorption in the first thermochemical module is realized using the water condenser.

8. The method according to claim 6, wherein the system comprises a third thermochemical module and the desorption in the third thermochemical module is realized using either of the first thermochemical module or the second thermochemical module as a condenser or using the water condenser.

9. The method according to claim 6, wherein the system comprises a third thermochemical module and the desorption in the third thermochemical module is realized using both the second and the first thermochemical modules as a condenser.

10. The method according to claim 6, wherein the thermochemical material is selected from the group consisting of zeolites, silica gel, hygroscopic salts, metal organic frameworks (MOF), carbon, and aluminum phosphates.

11. Method for performing a sorption in a system for thermochemical storage according to claim 1, comprising a step wherein the sorption in the second thermochemical module is realized using at least the first thermochemical module as an evaporator.

12. The method according to claim 6, comprising drying of the second thermochemical module by:
    providing said first thermochemical module as an earlier dried thermochemical module having the same temperature as said second thermochemical module, and
    exchanging water from said second thermochemical module to said earlier dried first thermochemical module having the same temperature as said second thermochemical module.

13. A method for performing a desorption in a system for thermochemical storage, the system comprising at least one water condenser and at least two thermochemical modules, wherein a first thermochemical module comprises a first thermochemical material and a second thermochemical module comprises a second thermochemical material, and wherein the at least one water condenser and the thermochemical modules are connected so that water vapor can be exchanged individually between any two selected from the group consisting of the at least one water condenser and the at least two thermochemical modules, the method comprising:
(a) heating the first thermochemical module to a first temperature while exchanging vapor with a water condenser,
(b) providing the second thermochemical module at a second temperature, and cooling the first thermochemical module from the first temperature to a third temperature, while preventing exchange of water vapor between the first and second thermochemical modules and with the water condenser, wherein said third temperature is lower than said second temperature, and
(c) exchanging water vapor between the first thermochemical module and the second thermochemical module, while the first thermochemical module is colder than the second thermochemical module, thereby transporting water vapor from the second thermochemical module to the first thermochemical module, such that the second thermochemical module is dried and the first thermochemical module functions as a condenser.

14. The method of claim 13, wherein the system further comprises a connection system, wherein said at least one water condenser and said at least two thermochemical modules has a connection through a valve with a central tube.

15. The method of claim 13, wherein the first and the second thermochemical material are different materials.

16. The method of claim 13, wherein the first and second thermochemical material are independently selected from the group consisting of a zeolite, silica gel, a hygroscopic salt, a metal organic frameworks (MOF), carbon, and an aluminum phosphate.

17. The method of claim 13, wherein the first and second thermochemical material are hygroscopic salts, independently selected from the group consisting of chlorides, sulfates, iodides, nitrates, sulfides, and hydrates thereof.

18. The method of claim 13, wherein the system further comprises a third thermochemical module comprising a third thermochemical material.

* * * * *